Patented July 4, 1950

2,513,632

UNITED STATES PATENT OFFICE 2,513,632

VINYL POLYMERS PLASTICIZED WITH CHLORINATED HYDROCARBONS

Eric William Musther Fawcett and Eric Sylvester Narracott, Sunbury-on-Thames, England, assignors to Anglo-Iranian Oil Company Limited, London, England, a British joint-stock corporation No Drawing. Application February 28, 1945, Serial No. 580,274. In Great Britain March 1, 1944

12 Claims. (Cl. 260—33.8)

The invention relates to the production of plasticised polyvinyl chloride or polyvinyl chloride co-polymers adapted for use for example in the preparation of coating compositions, cable dielectric compounds, and moulding compositions.

The use of substances of the character of tricresyl phosphate, dibutyl phthalate, and dibenzyl sebacate as plasticisers for polyvinyl chloride or its co-polymers has long been practised. They are polar in character, and are thus known to have an adverse effect on the electrical and water resistant properties of the polymers. Their other physical properties such for example as tensile strength are also known to depreciate rapidly with increasing additions of the plasticisers to those compositions.

In a co-pending application Serial No. 513,468, filed August 12, 1943, a process is described for producing such compositions in the use as plasticisers or partial plasticisers and/or fillers of certain hydrocarbons obtained from mineral oil fractions by extraction with selective solvents of a polar character. These hydrocarbons are preferably of molecular weight 250–750 boiling within the range 250–800 at 760 mm. Hg pressure. The preferred hydrocarbons are characterised by a high carbon content (at least .6 atom of carbon per atom of hydrogen) and may contain up to two unsaturated linkages per molecule. The hydrocarbons may also contain a minor proportion of sulphur and/or nitrogen in combined form. These high molecular weight hydrocarbons have good electrical and water resistant properties because of their non-polar character, and are compatible with polyvinyl chloride and many polyvinyl chloride co-polymers, such as the co-polymers of vinyl chloride with vinyl acetate, methyl acrylate, vinylidene chloride and the like, and act as fillers and partial plasticizers in such polymer compositions as are used for moulded and other goods particularly where a highly plasticised and extensible structure is not desired.

We have found however that certain extracts are only compatible with polyvinyl chloride and its co-polymers to a small extent, and this appears to be the case where the ratio of the extract to the original hydrocarbon fraction is high, and more particularly where the ratio is greater than about 25% by weight. We have observed however that this rule does not apply generally to such hydrocarbon fractions derived from all crude mineral oils, and there are certain crude oils from which it is possible to obtain yields of extracts up to and beyond 25% by weight, which display satisfactory compatibility with polyvinyl chloride or its co-polymers.

An object of the invention is to treat such extract hydrocarbons as show poor compatibility with polyvinyl chloride, whereby not only are their properties in this respect greatly improved, but in addition certain other of their properties are also improved, and in particular the low temperature flexibility of the resulting polyvinyl chloride and polyvinyl chloride co-polymer compositions, which is much superior to that of similar compositions containing untreated extracts. The invention is however of general application in the treatment of extract hydrocarbons.

According to the invention a mineral oil fraction or residue having the characteristics hereinbefore described is first extracted with a selective polar solvent or a mixture of solvents one at least of which is of a polar character. The desired hydrocarbons are to be found in the extract phase and are recovered by the removal of the solvent, advantageously by distillation. The hydrocarbons thus obtained are then chlorinated under conditions hereinafter described, and the resulting hydrocarbon material may then be incorporated with polyvinyl chloride or co-polymer compositions as a filler, or as a filler and plasticiser, either alone or with known plasticisers in smaller proportions.

The solvent extraction step may be carried out in known manner. We have found that a mixture of sulphur dioxide and benzene gives satisfactory results, but a wide range of other known solvents may advantageously be used for example, sulphur dioxide, alcohols, furfural, and phenols.

The chlorination may be carried out in known manner and advantageously by direct bubbling of chlorine through the agitated hydrocarbon material at a temperature of less than 150° C. and preferably at atmospheric temperature or slightly higher, and at atmospheric pressure. The chlorination may be carried on until up to 50% of chlorine by weight based on the original hydrocarbon material has been taken up. The preferred range of addition is however sufficient to obtain an increase in weight of the hydrocarbon material due to chlorination, of between 5% and 25%.

The chlorinated material may be processed in known manner, for example, by distillation, partial absorption on porous earths or adsorbent material, precipitation with solvent or otherwise, with the object of rendering the material lighter in colour before incorporation into compositions as hereinbefore described.

*Example 1.*—This example illustrates the method of preparation of a chlorinated hydrocarbon material.

A mineral oil fraction boiling in the approximate range 375–435° C. at 760 mm. Hg pressure was submitted to multi-stage, counter-current extraction with a mixture of sulphur dioxide and benzene in the ratio of 85 parts by volume of sulphur dioxide to 15 parts by volume of benzene, employing a total proportion of the mixture amounting to 200% by volume of the mineral oil fraction, and a temperature gradient during extraction of 140—25° F. The material extracted, after evaporation of the benzol and sulphur dioxide, amounted to 30% by weight of the original mineral oil fraction and had a specific gravity at 60° F. of 1.00.

The resulting product was treated at approximately room temperature with chlorine by bubbling chlorine through the stirred material. No external cooling was employed. The treatment was continued until the increase in weight due to chlorination amounted to 11% of the weight of the original hydrocarbon material, and the product at this stage had a specific gravity of 1.026.

*Example 2.*—40 parts by weight of the chlorinated hydrocarbon material prepared according to Example 1 were mixed at 140° C. in an internal mixer for ½ hr. with 100 parts by weight of polyvinyl chloride, 40 parts by weight of dibutyl phthalate and 5 parts by weight of white lead. The plasticised mass was thereupon moulded under pressure at 150° C. to form a sheet 0.10 inch thick. After nine months' storage at atmospheric temperatures no sweating of plasticiser was observed, whereas severe sweating was observed in a parallel composition containing the extracted hydrocarbon material, not subjected to chlorination.

The physical properties determined on the composition containing the chlorinated material were as indicated in the following Table 1.

Table 1

| | |
|---|---|
| Tensile strength | 2,200 lb./sq. in. |
| Elongation at Break | 350% |
| Shore Hardness | 67 |
| Volume Resistivity | $1.7 \times 10^{12}$ ohms cm. |
| Low Temperature Flexibility limit | $-40°$ C. |

*Example 3.*—The following cable insulation compounds containing the chlorinated hydrocarbon material prepared according to Example 1, were mixed for 20 minutes at 120° C., in an internal mixer, and then on an open roll mill for 20 minutes at 140° C. The plasticised sheets thus produced were moulded under pressure at 150° C. The proportions employed (in parts by weight) and the physical properties of the product are indicated by Examples 2 and 3 in the following table in comparison with a composition containing the same hydrocarbon material without chlorination (Example 1).

Table 2

| Compound No. | 1 | 2 | 3 |
|---|---|---|---|
| Polyvinyl chloride | 100 | 100 | 10* |
| Hydrocarbon material | 25 | | |
| Chlorinated hydrocarbon material | | 25 | 30 |
| Dibutyl phthalate | 25 | 25 | 30 |
| Lead silicate | 4 | 4 | 4 |
| Ethyl palmitate | 2 | 2 | 2 |
| *Properties* | | | |
| Tensile Strength, lb./sq. in. | 2,920 | 3,390 | 2,820 |
| Elongation at break, per cent | 270 | 240 | 270 |
| Shore Hardness | 80 | 75 | 75 |
| Volume Resistivity, ohm cm. | $5 \times 10^{13}$ | $3 \times 10^{13}$ | $1 \times 10^{13}$ |
| Specific Inductive Capacity: | | | |
| 50 c. p. s. | 4.87 | 4.84 | 5.38 |
| 800 c. p. s. | 3.98 | 3.73 | 4.10 |
| Loss Factor: | | | |
| 50 c. p. s. | 0.102 | 0.105 | 0.109 |
| 800 c. p. s. | 0.102 | 0.094 | 0.107 |
| Low Temperature Flexibility Limit, °C. | $-25$ | $-30$ | $-35$ |

We claim:

1. A process for the production of vinyl polymer plastic compositions of improved low temperature flexibility and improved electrical properties comprising intimately incorporating at a moderately elevated temperature a vinyl polymer substance selected from the group consisting of polyvinyl chloride, vinyl chloride-vinyl acetate co-polymer, vinyl chloride-methyl acrylate co-polymer, and vinyl chloride-vinylidene chloride co-polymer, with chlorinated hydrocarbons which have been produced by extracting from mineral oil fractions hydrocarbons of molecular weight in the range 200–800, having initial and final boiling points within the range 250–800° C. at 760 mm. of mercury pressure, containing up to two unsaturated linkages per molecule and having a carbon content of on average at least 0.6 atom of carbon per atom of hydrogen, said hydrocarbons being extracted with a solvent substance of polar character which forms an extract phase with the said hydrocarbons, removing said solvent substance from said phase to recover said hydrocarbons as an extract material and chlorinating the said hydrocarbons at about atmospheric temperature and about atmospheric pressure until up to 50% by weight of chlorine has been taken up, based on the weight of the said hydrocarbons.

2. A process for producing plastic compositions as specified in claim 1 in which the chlorinated hydrocarbons have been produced by direct bubbling of chlorine through the extract hydrocarbons while the extract hydrocarbons are in a state of motion.

3. A process for producing plastic compositions as specified in claim 1 in which the chlorination is carried out until 5–25% of chlorine by weight, based upon the extracted hydrocarbons, is taken up.

4. A process for producing plastic compositions as specified in claim 1 in which the chlorination is carried out until 5–15% of chlorine by weight, based upon the extracted hydrocarbons, is taken up.

5. A process for producing plastic compositions as specified in claim 1 in which the chlorination is carried out by direct bubbling of chlorine through the extracted hydrocarbons, maintained in a state of motion, until 5–15% of chlorine by weight, based upon the extracted hydrocarbons, is taken up.

6. A process for producing plastic compositions as specified in claim 1 in which the molecular weight of the extracted hydrocarbons is in the range of 250-750.

7. A process for producing plastic compositions as specified in claim 1 in which the chlorinated hydrocarbons are distilled to render them lighter in colour before admixture with the polyvinyl chloride.

8. A process for producing plastic compositions as specified in claim 1 in which the chlorinated hydrocarbons are rendered lighter in colour by partial adsorption on adsorbent material before admixture with the polyvinyl chloride.

9. A composition of matter of improved low temperature flexibility and improved electrical properties comprising an intimate admixture of a vinyl polymer substance selected from the group consisting of polyvinyl chloride, vinyl chloride-vinyl acetate co-polymer, vinyl chloride-methyl acrylate co-polymer, and vinyl chloride-vinylidene chloride co-polymer, with chlorinated hydrocarbons which have been produced by extracting from mineral oil fractions hydrocarbons of molecular weight in the range 200-800, having initial and final boiling points within the range 250-800° C. at 760 mm. of mercury pressure, containing up to two unsaturated linkages per molecule and having a carbon content of on average at least 0.6 atom of carbon per atom of hydrogen, said hydrocarbons being extracted with a solvent substance of polar character which forms an extract phase with the said hydrocarbons, removing said solvent substance from said phase to recover said hydrocarbons as an extract material and chlorinating the said hydrocarbons at about atmospheric temperature and about atmospheric pressure until up to 50% by weight of chlorine has been taken up, based on the weight of the said hydrocarbons.

10. A composition of matter as specified in claim 9 in which the chlorination is carried out until 5-25% of chlorine by weight, based upon the extracted hydrocarbons, is taken up.

11. A composition of matter as specified in claim 9 in which the chlorinated hydrocarbons are distilled to render them lighter in colour before admixture with the vinyl polymer substance.

12. A composition of matter as specified in claim 9 in which the chlorinated hydrocarbons are rendered lighter in colour by partial adsorption on adsorbent material before admixture with the vinyl polymer substance.

ERIC WILLIAM MUSTHER FAWCETT.
ERIC SYLVESTER NARRACOTT.

REFERENCES CITED

The following references are of record in the file of this patent:

UNITED STATES PATENTS

| Number | Name | Date |
|---|---|---|
| 2,365,053 | Churchill et al. | Dec. 12, 1944 |

OTHER REFERENCES

Vinylite Co-polymer Resins for Surface Coatings, page 27, published by Carbide & Carbon Chemicals Corporation, 1942.